(12) United States Patent
Chen et al.

(10) Patent No.: US 9,862,150 B2
(45) Date of Patent: *Jan. 9, 2018

(54) THREE DIMENSIONAL PRINTING APPARATUS AND PRINTING METHOD THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Ming-Hsiung Ding, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,731

(22) Filed: Dec. 3, 2014

(65) Prior Publication Data

US 2016/0096332 A1  Apr. 7, 2016

(30) Foreign Application Priority Data

Oct. 2, 2014  (TW) .............................. 103134376 A

(51) Int. Cl.
*B29C 67/00*  (2017.01)
*B33Y 30/00*  (2015.01)
(Continued)

(52) U.S. Cl.
CPC ........ *B29C 67/0088* (2013.01); *B29C 64/227* (2017.08); *B29C 67/0066* (2013.01);
(Continued)

(58) Field of Classification Search
CPC ..... B33Y 30/00; B33Y 50/02; B29C 67/0088; B29C 67/0066; B29C 64/227;
(Continued)

(56) References Cited

U.S. PATENT DOCUMENTS 5,009,585 A * 4/1991 Hirano ................ B29C 67/0066
118/500
5,089,184 A * 2/1992 Hirano ................ B29C 67/0066
156/273.5

(Continued)

FOREIGN PATENT DOCUMENTS

CN  103448249  12/2013
CN  203317755  12/2013

(Continued)

OTHER PUBLICATIONS

"Office Action of Taiwan Counterpart Application", dated Jul. 28, 2015, p. 1-p. 8.

*Primary Examiner* — Alison L Hindenlang
*Assistant Examiner* — Jerzi H Moreno Hernandez
(74) *Attorney, Agent, or Firm* — JCIPRNET

(57) ABSTRACT

A three-dimensional printing apparatus and a printing method thereof are provided. The three-dimensional printing apparatus includes a tank, a movable platform, a light source module, and a controller. The bottom of the tank includes an irradiated area and a non-irradiated area. The movable platform is movably disposed above the tank. The light source module is disposed under the tank and only provides light to the irradiated area to irradiate a liquid-formation material. The controller controls the movable platform to move along a first axis direction, such that at least one layer object of a three-dimensional object is cured on the movable platform layer by layer. The layer object is composed of object sections. During a period of forming one layer object, the controller controls the movable platform to move on a (Continued)

horizontal plane, such that the object sections of the layer object are cured sequentially above the irradiated area.

5 Claims, 5 Drawing Sheets

(51) Int. Cl.
  *B33Y 50/02* (2015.01)
  *B29C 64/227* (2017.01)
  *B33Y 10/00* (2015.01)
  *B29C 64/386* (2017.01)
  *B29C 64/135* (2017.01)
  *B29C 64/129* (2017.01)
  *B29C 64/20* (2017.01)

(52) U.S. Cl.
  CPC .............. *B33Y 10/00* (2014.12); *B33Y 30/00* (2014.12); *B33Y 50/02* (2014.12); *B29C 64/129* (2017.08); *B29C 64/135* (2017.08); *B29C 64/20* (2017.08); *B29C 64/386* (2017.08)

(58) Field of Classification Search
  CPC ..... B29C 64/20; B29C 64/386; B29C 64/129; B29C 64/135; B29K 2105/0058; B22F 3/1055
  See application file for complete search history.

(56) References Cited

U.S. PATENT DOCUMENTS

| | | | | |
|---|---|---|---|---|
| 5,184,307 A * | 2/1993 | Hull | ................... | B29C 67/0066 156/273.3 |
| 5,204,055 A * | 4/1993 | Sachs | ..................... | B05C 19/04 264/113 |
| 5,238,614 A * | 8/1993 | Uchinono | ........... | B29C 67/0066 118/423 |
| 5,534,104 A * | 7/1996 | Langer | ................ | B29C 67/0092 156/275.5 |
| 5,554,336 A * | 9/1996 | Hull | ...................... | G03F 7/0037 118/423 |
| 5,740,051 A * | 4/1998 | Sanders, Jr. | ........ | B29C 67/0055 347/1 |
| 6,051,179 A * | 4/2000 | Hagenau | ............... | B29C 67/007 264/401 |
| 6,482,576 B1 * | 11/2002 | Farnworth | .............. | B29C 41/48 264/401 |
| 6,537,482 B1 * | 3/2003 | Farnworth | .......... | B29C 67/0066 257/E21.503 |
| 7,128,866 B1 * | 10/2006 | Henningsen | ........ | B29C 67/0066 264/1.26 |
| 8,048,359 B2 * | 11/2011 | Wang | .................... | B29C 67/007 264/308 |
| 8,226,394 B2 * | 7/2012 | Honda | ................ | B29C 67/0066 425/174.2 |
| 8,348,655 B2 * | 1/2013 | Kuzusako | ........... | B29C 67/0055 264/401 |
| 8,985,989 B2 * | 3/2015 | Wu | ..................... | B29C 67/0059 264/308 |
| 9,511,546 B2 * | 12/2016 | Chen | ................... | B29C 67/0062 |
| 2003/0003405 A1 * | 1/2003 | Farnworth | .............. | B29C 41/48 430/322 |
| 2007/0029706 A1 * | 2/2007 | Ueno | .................... | B29C 67/007 264/401 |
| 2008/0157412 A1 * | 7/2008 | Kihara | ................ | B29C 67/0066 264/1.1 |
| 2009/0196946 A1 * | 8/2009 | Kihara | ................ | B29C 67/0066 425/171 |
| 2009/0309267 A1 * | 12/2009 | Boot | .................... | B29C 67/0066 264/496 |
| 2010/0100222 A1 * | 4/2010 | Skubic | ................ | B29C 67/0085 700/110 |
| 2010/0262272 A1 * | 10/2010 | Shkolnik | ............. | B29C 67/0088 700/120 |
| 2012/0195994 A1 * | 8/2012 | El-Siblani | ............. | B29C 67/007 425/174.4 |
| 2012/0205826 A1 * | 8/2012 | Honda | ................ | B29C 67/0066 264/1.36 |
| 2012/0242007 A1 * | 9/2012 | Coeck | ................. | B29C 67/0066 264/401 |
| 2015/0044318 A1 * | 2/2015 | Ohkusa | ............... | B29C 67/0085 425/174.4 |
| 2015/0064298 A1 * | 3/2015 | Syao | ................... | B29C 67/0062 425/169 |
| 2015/0283611 A1 * | 10/2015 | Takezawa | ............ | B22F 3/1055 425/78 |

FOREIGN PATENT DOCUMENTS

| | | |
|---|---|---|
| CN | 103660301 | 3/2014 |
| CN | 103921445 | 7/2014 |
| TW | M484504 | 8/2014 |

* cited by examiner

THREE DIMENSIONAL PRINTING APPARATUS AND PRINTING METHOD THEREOF

CROSS-REFERENCE TO RELATED APPLICATION

This application claims the priority benefit of Taiwan application serial no. 103134376, filed on Oct. 2, 2014. The entirety of the above-mentioned patent application is hereby incorporated by reference herein and made a part of this specification.

BACKGROUND

Technical Field

The technical field relates to a printing apparatus and more particularly relates to a three-dimensional printing apparatus and a printing method thereof.

Description of Related Art

As technology advanced in the recent years, many methods that utilize additive manufacturing technology (e.g., layer-by-layer model construction) to build three-dimensional (3D) physical models have been proposed. Generally speaking, the additive manufacturing technology is to transfer data of the design of a 3D model, which is constructed by software, such as computer aided design (CAD), to multiple thin (quasi-two-dimensional) cross-sectional layers that are stacked in sequence. In the meantime, many techniques for forming thin cross-sectional layers are also proposed. For example, a printing module of a printing apparatus is usually configured to move above a base along an XY plane according to spatial coordinates XYZ constructed according to the design data of the 3D model, so as to use a construction material to form shapes of the cross-sectional layers correctly.

Take the technique of forming a three-dimensional object by curing the construction material with a light source for example, the printing module is adapted to be immersed in a liquid-form nation material contained in a tank, and a light source module is used to irradiate the liquid-formation material, used as the construction material, on the XY plane, so as to cure the liquid-formation material and stack it on a movable platform. Accordingly, by moving the movable platform layer by layer along the Z axis direction, the liquid-formation material can be gradually cured and stacked to form the three-dimensional object. According to the conventional technology, the irradiation range of the light source module needs to cover the entire formation surface of the movable platform, such that the light can be provided to every part of the formation surface of the movable platform for curing the liquid-formation material between the movable platform and the bottom of the tank. Thus, it is known that, for a three-dimensional object that is large in size or a movable platform that has a large area, the irradiation range of the light source module needs to be improved, so as to completely print the three-dimensional object. However, no matter the light source module is a point light source or a planar light source, the increase of the irradiation range would certainly raise the production costs of the three-dimensional printing apparatus and increase the galvanometer complexity of the light source module.

SUMMARY

The disclosure provides a three-dimensional printing apparatus and a printing method thereof, which achieve large-area printing using a light source module with a smaller irradiation range, thereby reducing the production costs of the three-dimensional printing apparatus and avoiding use of a complicated galvanometer in the light source module.

The disclosure provides a three-dimensional printing apparatus, which includes a tank, a movable platform, a light source module, and a controller. The tank is configured to contain a liquid-formation material. A bottom of the tank includes an irradiated area and a non-irradiated area. The movable platform is movably disposed above the tank. The light source module is disposed under the tank and provides light to the irradiated area to irradiate the liquid-formation material. The controller is coupled to the light source module and the movable platform. The controller controls the movable platform to move above the tank along a first axis direction, such that at least one layer object of a three-dimensional object is cured on the movable platform layer by layer. The layer object consists of a plurality of object sections. During a period of forming the layer object, the controller controls the movable platform to move on a horizontal plane, such that the object sections of the layer object are cured sequentially above the irradiated area.

From another aspect, the disclosure provides a printing method of a three-dimensional printing apparatus. The three-dimensional printing apparatus is adapted for printing a three-dimensional object and includes a tank containing a liquid-formation material and a movable platform. The printing method includes the following. A light source module is disposed for irradiating a bottom of the tank. The bottom of the tank includes an irradiated area and a non-irradiated area. The light source module provides light to the irradiated area and does not provide light to the non-irradiated area. When the movable platform rises to a height along a vertical axis direction for printing at least one layer object of the three-dimensional object, the movable platform is controlled to move on a horizontal plane, such that a plurality of object sections of the layer object are cured sequentially above the irradiated area.

Based on the above, in the embodiments of the disclosure, the bottom of the tank includes the irradiated area and the non-irradiated area, and the light source module only provides light to the irradiated area but not to the non-irradiated area. During the period of printing one layer object, the movable platform is rotated or moved linearly on the horizontal plane, so as to move and place each surface portion of the formation surface of the movable platform just above the irradiated area. Accordingly, each object section of the one layer object can be sequentially formed between the irradiated area and each surface portion. Since the irradiation range of the light source module can be reduced, the disclosure lowers the operation and maintenance costs of the three-dimensional printing apparatus and reduces errors caused by the light source module.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
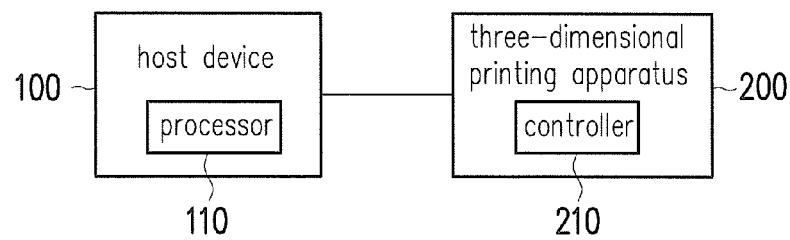
FIG. 1 is a block diagram illustrating a three-dimensional printing system according to an embodiment of the disclosure.

It should be understood that the foregoing and other detailed descriptions, features, and effects are intended to be described more comprehensively by providing embodiments accompanied with drawings hereinafter. In the following embodiments, wording used to indicate directions, such as "up," "down," "front," "back," "left," and "right," merely refers to directions in the accompanying drawings. Therefore, the directional wording is used to illustrate rather than limit the disclosure. Moreover, the same or similar reference numerals represent the same or similar elements in the following embodiments.

FIG. 1 is a block diagram illustrating a three-dimensional printing system according to an embodiment of the disclosure. With reference to FIG. 1, a three-dimensional printing system 10 includes a host device 100 and a three-dimensional printing apparatus 200. The host device 100 is coupled to the three-dimensional printing apparatus 200 and includes a processor 110 that has computing and processing functions. The three-dimensional printing apparatus 200 includes a controller 210 configured to control a plurality of components of the three-dimensional printing apparatus 200, so as to carry out a three-dimensional printing function.

More specifically, the host device 100 is a device with a computing function, which may be a computer device, such as a laptop computer, a tablet computer, and a desktop computer. The disclosure is not intended to limit the type of the host device 100. In this embodiment, the processor 110 of the host device 100 is capable of editing and processing a three-dimensional model of a three-dimensional object and transmitting corresponding three-dimensional printing information to the three-dimensional printing apparatus 200, for the three-dimensional printing apparatus 200 to print out the three-dimensional object according to the three-dimensional printing information. More specifically, the three-dimensional model may be a digital three-dimensional image file that is constructed by the host device 100 by means of computer-aided design (CAD) or animation modeling software, for example.

The three-dimensional printing apparatus 200 is adapted for printing a three-dimensional object according to the three-dimensional printing information transmitted by the host device 100. To be more specific, the controller 210 controls each component of the three-dimensional printing apparatus 200 according to the three-dimensional printing information, so as to reiteratively print a formation material on a platform until the whole three-dimensional object is completed.

The processor 110 and the controller 210 may be a central processing unit (CPU), a programmable microprocessor for general or special use, a digital signal processor (DSP), a programmable controller, an application specific integrated circuit (ASIC), a programmable logic device (PLD), other similar devices, or a combination of these devices, for example. Nevertheless, the disclosure is not intended to limit the types of the processor 110 and the controller 210.

It should be noted that the three-dimensional model is further computed and transformed to generate the three-dimensional printing information that the three-dimensional printing apparatus 200 reads to execute the printing function. More specifically, the processor 110 divides the three-dimensional model into pieces of cross-sectional information and obtains a plurality of layer objects sequentially according to the cross-sectional information of the three-dimensional model, wherein the layer objects are stacked to form the three-dimensional object.

It should be pointed out that, in this exemplary embodiment, the processor 110 further divides one layer object into a plurality of object sections according to layer object information of the one layer object. In other words, in addition to obtaining the layer objects by performing a slicing process according to the three-dimensional model information, the processor 110 of this embodiment further performs an additional dividing/cutting process on each layer object to obtain the object sections of each layer object.

Further to the above, the processor 110 generates corresponding control code files according to the cross-sectional information of the object sections for the controller 210 of the three-dimensional printing apparatus 200 to control the components of the three-dimensional printing apparatus 200 according to the control code files, so as to form at least one object section of one layer object on the platform. Moreover, in this exemplary embodiment, the control code files are associated with the object sections that constitute each layer object, such that the three-dimensional printing apparatus 200 prints each object section sequentially according to the control code files. Here, the control code files are the three-dimensional printing information that the controller 210 reads to execute the printing function. In an embodiment, the control code file is a G code file, for example.

Figure 2:
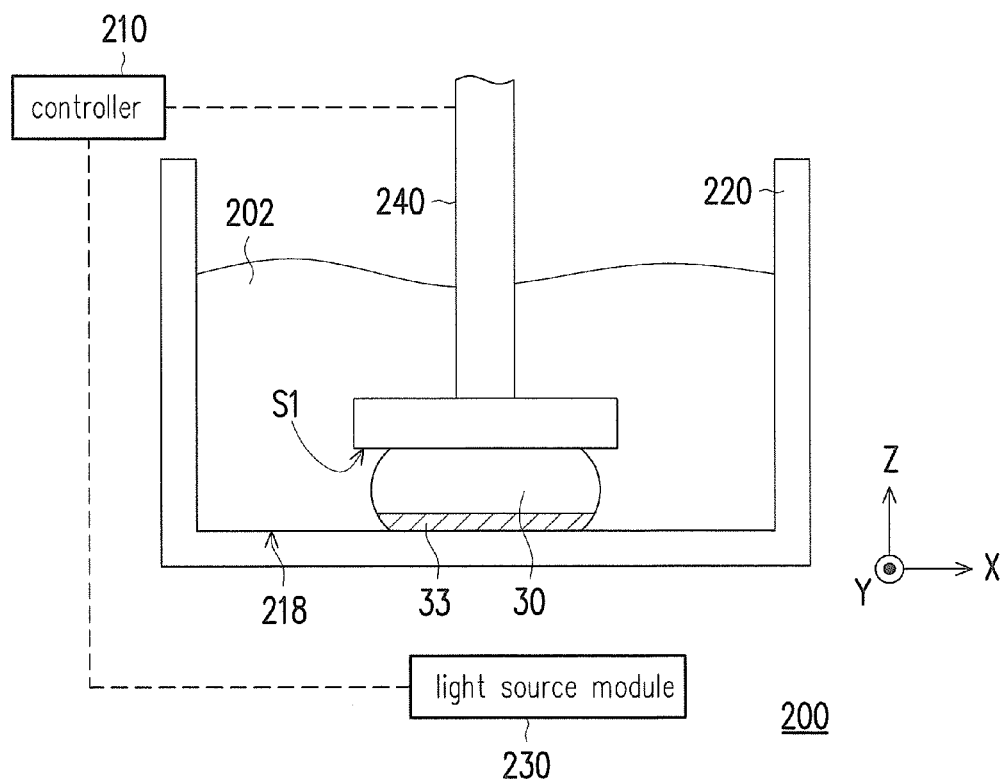
FIG. 2 is a schematic diagram illustrating a three-dimensional printing apparatus according to an embodiment of the disclosure.

FIG. 2 is a schematic diagram illustrating a three-dimensional printing apparatus according to an embodiment of the disclosure. With reference to FIG. 2, in this embodiment, a three-dimensional printing apparatus 200 is a SL (Stereo Lithography Appearance) three-dimensional printing apparatus, which includes a controller 210, a tank 220, a light source module 230, and a movable platform 240. Here, a Cartesian coordinate system is used to describe the relevant components and their motions. The tank 220 is configured to contain a liquid-formation material 202, and the movable platform 240 is controlled by the controller 210 and is movably disposed along a Z axis direction above the tank 220. Accordingly, the movable platform 240 can be moved into or out of the tank 220 and is immersed in the liquid-formation material 202. The controller 210 is coupled to the light source module 230 and the movable platform 240. The controller 210 controls the movable platform 240 to ascend gradually along the Z axis direction above the tank 220, such that at least one layer object of a three-dimensional object 30 is cured on the movable platform 240 layer by layer.

To be more specific, the three-dimensional printing apparatus 200 irradiates the bottom 218 of the tank 220 with light of the light source module 230, so as to cure the liquid-formation material 202 between the formation surface S1 of the movable platform 240 and the bottom 218 of the tank 220. Then, the three-dimensional printing apparatus 200 gradually drives the movable platform 240 away from the bottom 218 of the tank 220 along the Z axis, so as to cure a plurality of layer objects of the three-dimensional object 30 layer by layer.

In this exemplary embodiment, the light source module 230 is disposed under the tank 220. The controller 210 controls the light source module 230 according to three-dimensional printing information, such that a point light source or a planar light source provided by the light source module 230 irradiates a designated part of the bottom 218 of the tank 220. The light source module 230 is a laser element and/or a galvanometer module, a light projection module based on digital light processing (DLP) technology, or a LED light bar, for example. This disclosure is not intended to limit the type and composition of the light source module 230. The liquid-formation material 202 is a photosensitive resin, for example. The light source module 230 is configured to provide light of a wave band, such as ultraviolet light or laser light, for curing the photosensitive resin.

In this exemplary embodiment, an irradiation range of the light source module 230 does not cover the entire bottom 218 of the tank 220 but covers a partial area of the bottom 218 of the tank 220, and the light source module 230 provides light to the partial area of the bottom 218 for irradiating the liquid-formation material. Therefore, in this embodiment, a layer object 33 of the three-dimensional object 30 is composed of a plurality of object sections. During a period of forming the layer object 33, the controller 210 controls the movable platform 240 to move on a horizontal plane, such that the object sections of the layer object 33 are cured sequentially above the irradiated area. In an exemplary embodiment, the irradiated area of the bottom 218 of the tank 220 is equivalent to a maximum irradiation range of the light source module 230.

Figure 3:
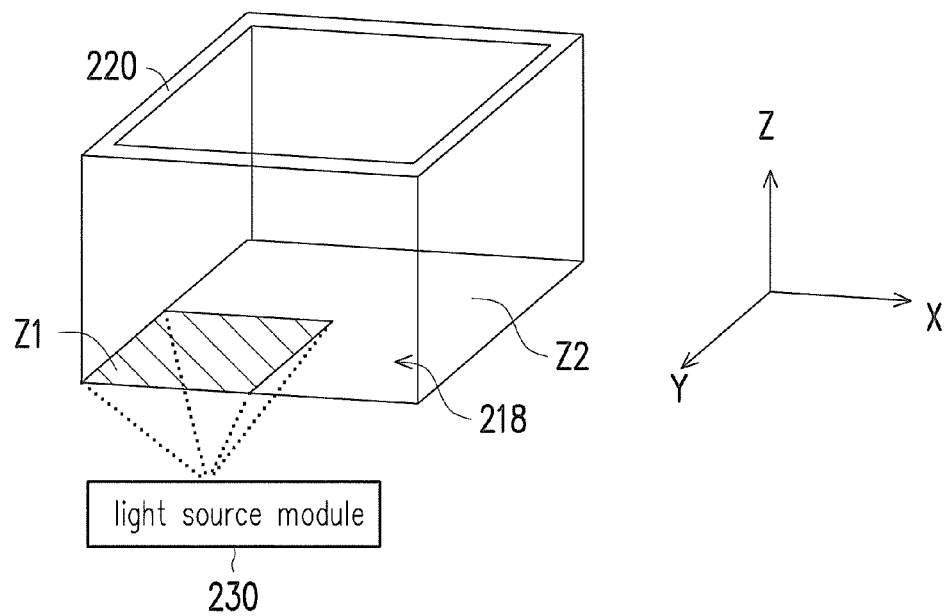
FIG. 3 is an exemplary diagram illustrating a tank and an irradiation range of a light source module according to an embodiment of the disclosure.

For example, FIG. 3 is an exemplary diagram illustrating the tank and the irradiation range of the light source module according to an embodiment of the disclosure. In the example shown in FIG. 3, due to the limitation of the irradiation range of the light source module 230, the bottom 218 of the tank 220 includes an irradiated area Z1 and a non-irradiated area Z2. More specifically, the light source module 230 irradiates the liquid-formation material above the irradiated area Z1 but does not irradiate the liquid-formation material above the non-irradiated area Z2.

Figure 4:
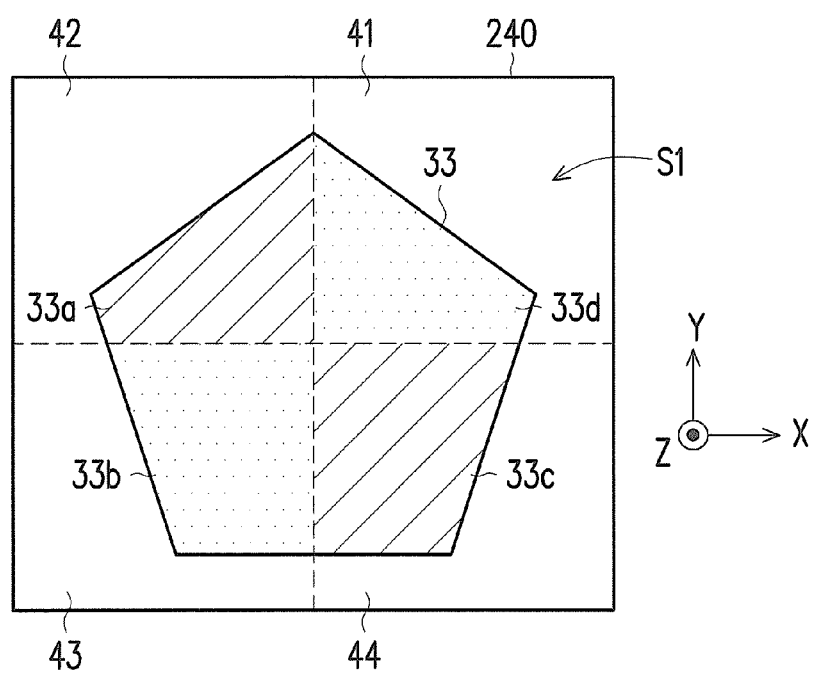
FIG. 4 is an exemplary diagram illustrating one single layer object according to the embodiment of FIG. 3.

Based on the above, the movable platform 240 of this exemplary embodiment can not only be moved vertically along the Z axis direction but also be moved on an XY plane. Thus, in the process of printing one layer object, by moving the movable platform 240 on the XY plane, each object section of the layer object is sequentially formed between the formation surface S1 and the irradiated area Z1. For example, FIG. 4 is an exemplary diagram illustrating formation of one layer object according to the embodiment of FIG. 3. With reference to FIG. 3 and FIG. 4, in the example shown in FIG. 4, the movable platform 240 includes the formation surface S1. The formation surface S1 is divided into a plurality of surface portions, which include a surface portion 41, a surface portion 42, a surface portion 43, and a surface portion 44. The controller 210 controls the movable platform 240 to move on the XY plane, so as to sequentially move and place all or a part of the surface portion 41, the surface portion 42, the surface portion 43, and the surface portion 44 above the irradiated area Z1.

It is known that the area of the formation surface S1 is N times the area of the irradiated area Z1, wherein N is an integer greater than 1. FIG. 4 illustrates an example of printing one layer object 33, wherein the area of the formation surface S1 is 4 times the area of the irradiated area Z1. The controller 210 controls the movable platform 240 to move on the XY plane, so as to move and place the surface portion 41 of the formation surface S1 just above the irradiated area Z1. Then, the controller 210 controls an irradiation path or an irradiation shape of the light source module 230 according to control code information corresponding to an object section 33$d$, so as to cure the liquid-formation material between the surface portion 41 and the irradiated area Z1 to form the object section 33$d$.

After forming the object section 33$d$, the controller 210 further controls the movable platform 240 to move on the XY plane, so as to sequentially move and place the other surface portions, i.e., the surface portion 42, the surface portion 43, and the surface portion 44, of the formation surface S1, just above the irradiated area Z1. Likewise, the controller 210 controls the irradiation path or the irradiation shape of the light source module 230 according to the control code information corresponding to object sections 33$c$, 33$b$, and 33$a$, so as to respectively cure the liquid-formation material between the surface portion 42, the surface portion 43, and the surface portion 44 and the irradiated area Z1, and thereby sequentially form the object sections 33$c$, 33$b$, and 33$a$.

Nevertheless, it should be noted that FIG. 3 and FIG. 4 merely illustrate examples of the disclosure and are not intended to limit the disclosure. This disclosure is not intended to limit the irradiation range of the light source module, which may be varied and designed by those skilled in the art according to the actual requirements and application. Also, it is known from the above that, as the area of the irradiated area decreases, the movable platform is moved more times so as to sequentially move and place each surface portion of the formation surface above the irradiated area. That is, as the area of the irradiated area increases, the number of times of moving the movable platform, required for forming one layer object, decreases accordingly.

Thus, because the movable platform is movable on the XY plane, the irradiation range of the light source module does not need to cover the entire bottom of the tank, and the printing of the three-dimensional object can be completed using the light source module that has a smaller irradiation range. Accordingly, the production costs for the light source module are reduced. Or, the complexity of the components of the light source module is lowered to reduce errors caused by the light source module.

In addition, it should be mentioned that, based on an irradiation position and area of the irradiated area, the number of times of moving the movable platform, a path of moving the movable platform, or a manner of moving the movable platform may differ. Specifically, the movable platform may be rotated or moved linearly on the XY plane so as to move and place each surface portion right above the irradiated area. Several embodiments are provided and described in detail below.

Figure 5A:
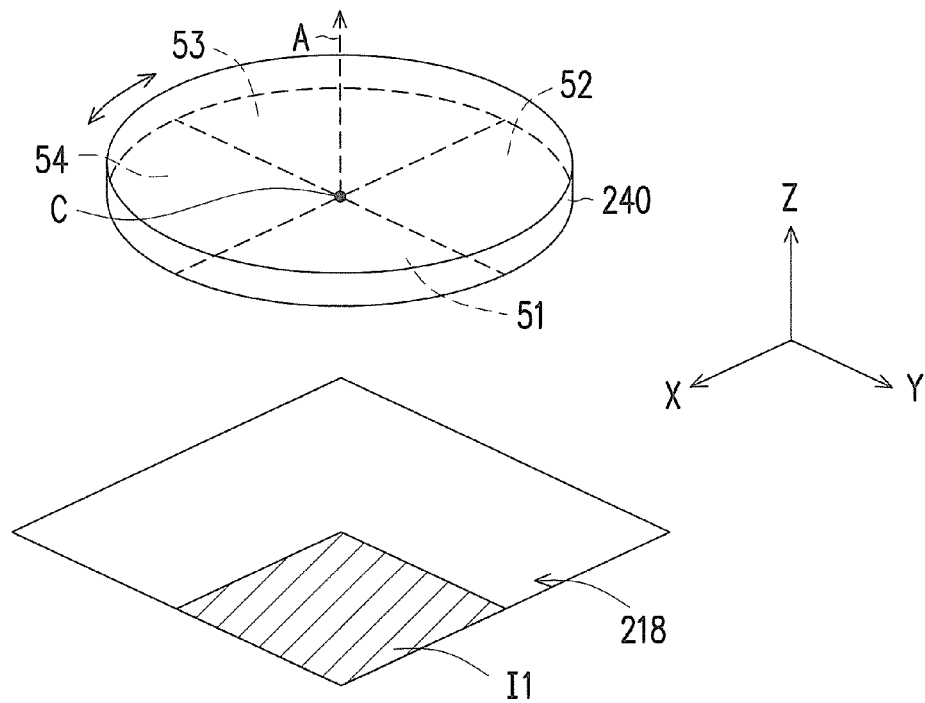
FIG. 5A is an exemplary diagram illustrating a bottom of the tank and a movable platform according to an embodiment of the disclosure.
Figure 5B:
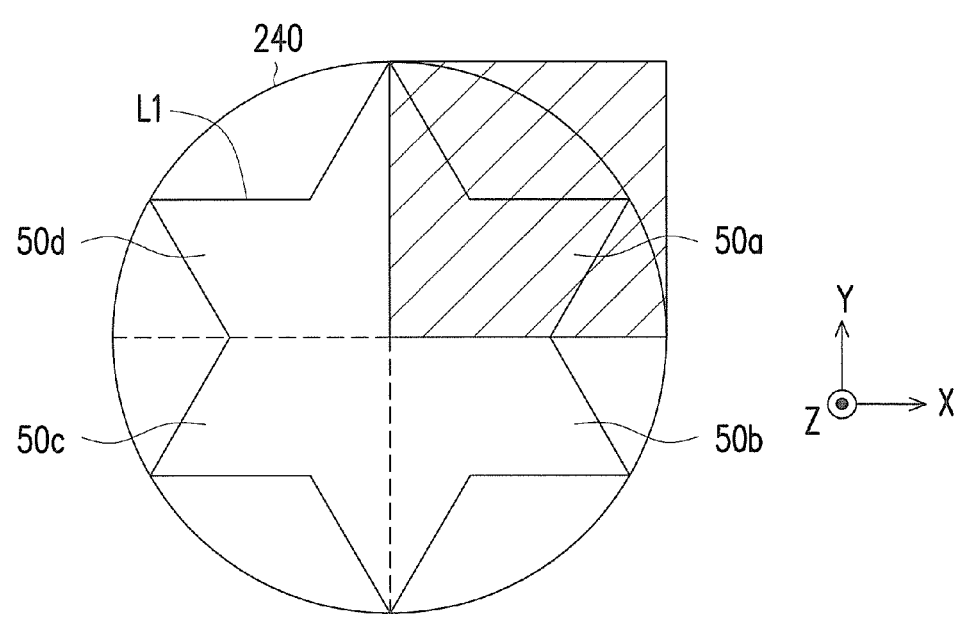
FIG. 5B is an exemplary diagram illustrating the movable platform and the layer object according to an embodiment of the disclosure.

FIG. 5A is an exemplary diagram illustrating the bottom of the tank and the movable platform according to an embodiment of the disclosure. FIG. 5B is an exemplary diagram illustrating the movable platform and the layer object according to an embodiment of the disclosure. Here it is given that the area of an irradiated area I1 is about ¼ of the area of the bottom 218 of the tank. Accordingly, the formation surface of the movable platform 240 is divided into a surface portion 51, a surface portion 52, a surface portion 53, and a surface portion 54.

With reference to FIG. 5A, in this exemplary embodiment, a shape of the movable platform 240 is circular and the movable platform 240 is rotatable around a rotation axis A on the XY plane, wherein the rotation axis A passes through a central point C of the movable platform 240 and is perpendicular to the XY plane. With reference to FIG. 5A and FIG. 5B, in the process of printing a layer object L1, the controller 210 controls the movable platform 240 to rotate around the rotation axis A on the XY plane, and the light source module irradiates the liquid-formation material according to the profile information of each object section so as to sequentially cure each object section of the layer object.

To be more specific, the movable platform 240 is sequentially rotated around the rotation axis A by a plurality of predetermined angles. In this exemplary embodiment, the predetermined angles are respectively set at 90 degrees. In other words, the movable platform 240 is consecutively rotated by 90 degrees to sequentially move and place the surface portion 51, the surface portion 52, the surface portion 53, and the surface portion 54 of the formation surface of the movable platform 240 just above the irradiated area I1.

More specifically, when the movable platform 240 is rotated around the rotation axis A by one of the predetermined angles, one of the surface portions of the formation surface is rotated and placed above the irradiated area I1, and one of the object sections is formed between one of the surface portions and the irradiated area I1. For example, when the movable platform 240 is rotated around the rotation axis A by 90 degrees, the surface portion 51 of the formation surface is rotated and placed above the irradiated area I1, and the object section 50a is formed between the surface portion 51 and the irradiated area I1. In the same way, through rotation of the movable platform 240, the surface portions 52, 53, and 54 of the formation surface are sequentially moved and placed right above the irradiated area I1, and accordingly the object sections 50b, 50c, and 50d are sequentially formed between the surface portions 52, 53, and 54 and the irradiated area I1. It is known from the above that the number of the object sections and the number of the surface portions of the formation surface are the same. Nevertheless, it should be noted that FIG. 5A and FIG. 5B merely illustrate examples of the disclosure and are not intended to limit the disclosure. In another exemplary embodiment, the predetermined angle is 180 degrees, and accordingly the number of the surface portions of the formation surface and the number of the object sections are both 2.

Figure 6A:
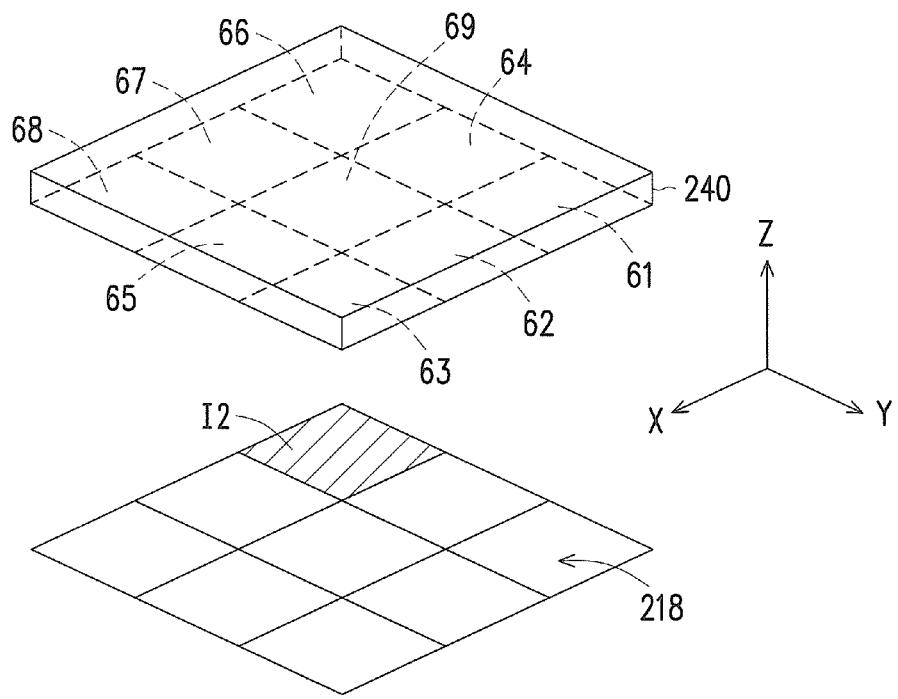
FIG. 6A is an exemplary diagram illustrating the bottom of the tank and the movable platform according to an embodiment of the disclosure.
Figure 6B:
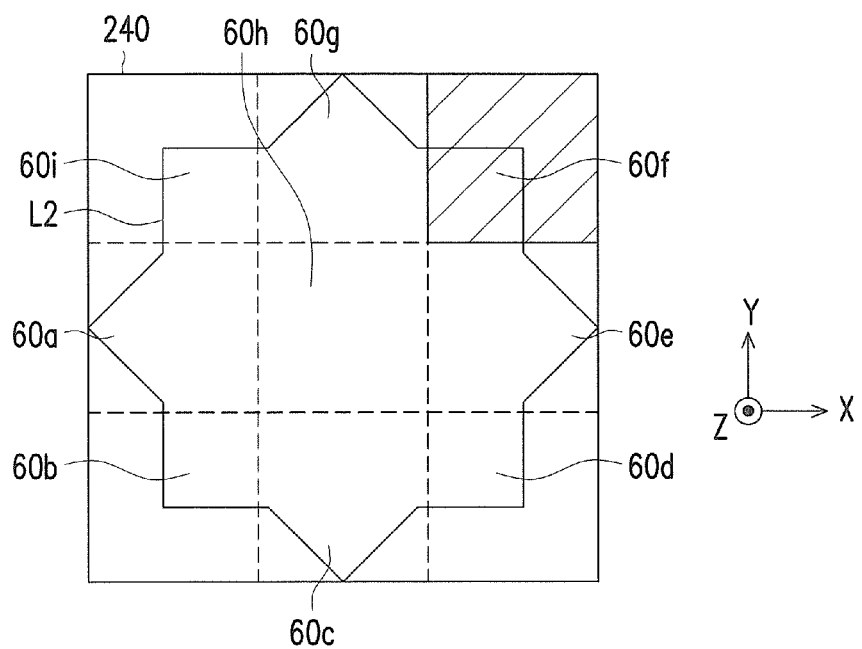
FIG. 6B is an exemplary diagram illustrating the movable platform and the layer object according to an embodiment of the disclosure.

Further, FIG. 6A is an exemplary diagram illustrating the bottom of the tank and the movable platform according to an embodiment of the disclosure. FIG. 6B is an exemplary diagram illustrating the movable platform and the layer object according to an embodiment of the disclosure. Here it is given that the area of an irradiated area I2 is about ⅑ of the area of the bottom 218 of the tank. Accordingly, the formation surface of the movable platform 240 is divided into a surface portion 61, a surface portion 62, a surface portion 63, a surface portion 64, a surface portion 65, a surface portion 66, a surface portion 67, a surface portion 68, and a surface portion 69.

With reference to FIG. 6A, in this exemplary embodiment, the shape of the movable platform 240 is rectangular and the movable platform 240 is linearly movable on the XY plane along an X axis direction and a Y axis direction. In other words, the movable platform 240 is horizontally movable on the XY plane at a fixed height on the Z axis. With reference to FIG. 6A and FIG. 6B, in the process of printing a layer object L2, the controller 210 controls the movable platform 240 to move linearly on the XY plane, and the light source module irradiates the liquid-formation material according to the profile information of each object section, so as to sequentially cure each object section of the layer object L2.

To be more specific, the movable platform 240 can be moved linearly to a plurality of predetermined positions at the same height on the XY plane. In this exemplary embodiment, the movable platform 240 is linearly movable to nine predetermined positions on the XY plane, so as to sequentially move and place the surface portion 61, the surface portion 62, the surface portion 63, the surface portion 64, the surface portion 65, the surface portion 66, the surface portion 67, the surface portion 68, and the surface portion 69 of the formation surface of the movable platform 240 just above the irradiated area I2.

Furthermore, when the movable platform 240 is moved linearly to one of the predetermined positions, one of the surface portions of the formation surface is moved and placed above the irradiated area I2 of the tank, and one of the object sections is formed between one of the surface portions and the irradiated area I2. For example, when the movable platform 240 is moved linearly to one of the predetermined positions, the surface portion 66 of the formation surface is moved and placed right above the irradiated area I2 of the tank, and the object section 60f is formed between the surface portion 66 and the irradiated area I2.

In the same way, through linear movement of the movable platform 240, the surface portion 61, the surface portion 62, the surface portion 63, the surface portion 64, the surface portion 65, the surface portion 66, the surface portion 67, the surface portion 68, and the surface portion 69 of the formation surface are sequentially moved and placed above the irradiated area I2, and the object section 60i, the object section 60a, the object section 60b, the object section 60g, the object section 60c, the object section 60e, the object section 60d, and the object section 60h are respectively formed above the irradiated area I2. It is known from the above that the number of the object sections and the number of the surface portions of the formation surface are the same. Nevertheless, it should be noted that FIG. 6A and FIG. 6B merely illustrate examples of the disclosure and are not intended to limit the disclosure. In another exemplary embodiment, the area of the irradiated area is ¼ of the area of the bottom 218 of the tank, and accordingly the number of the surface portions of the formation surface and the number of the object sections are both 4.

Figure 7:
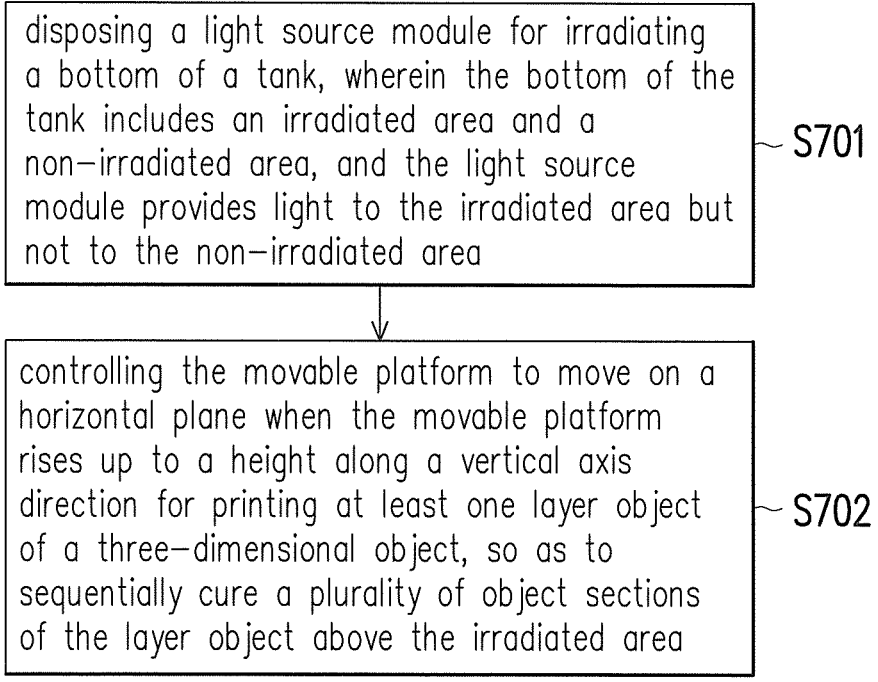
FIG. 7 is a flowchart illustrating a printing method of the three-dimensional printing apparatus according to an embodiment of the disclosure.

FIG. 7 is a flowchart illustrating a printing method of the three-dimensional printing apparatus according to an embodiment of the disclosure. The printing method is adapted for printing a three-dimensional object, details of which have been specified in the descriptions of FIG. 1 to FIG. 6B. First, in Step S701, a light source module is disposed for irradiating a bottom of a tank. The bottom of the tank includes an irradiated area and a non-irradiated area. The light source module provides light to the irradiated area and does not provide light to the non-irradiated area. In Step S702, when the movable platform rises up to a height along a vertical axis direction for printing at least one layer object of the three-dimensional object, the movable platform is controlled to move on a horizontal plane, so as to sequentially cure a plurality of object sections of the layer object above the irradiated area.

To conclude the above, in the embodiments of the disclosure, the bottom of the tank includes the irradiated area and the non-irradiated area, and the light source module provides light to the irradiated area but not to the non-irradiated area. Because the movable platform is movable on the horizontal plane, the irradiation range of the light source module does not need to cover the entire bottom of the tank. Therefore, for a three-dimensional printing apparatus with a large-area formation surface, it is not required to dispose a light source module having a relatively large irradiation range. The printing of a large-sized three-dimensional object can be carried out with use of the light source module having a smaller irradiation range. Since the irradiation range of the light source module can be reduced, the production costs required for the light source module are lowered. Or, the complexity of the components of the light source module can be reduced to suppress printing errors caused by assembly errors of the light source module.

It will be apparent to those skilled in the art that various modifications and variations can be made to the disclosed embodiments without departing from the scope or spirit of the disclosure. In view of the foregoing, it is intended that the disclosure covers modifications and variations of this disclosure provided that they fall within the scope of the following claims and their equivalents.

What is claimed is:

1. A three-dimensional printing apparatus, comprising:
   a tank configured to contain a liquid-formation material, wherein a bottom of the tank comprises an irradiated area and a non-irradiated area;
   a movable platform disposed movably above the tank and comprising a formation surface that comprises a plurality of surface portions, wherein the surface portions form the formation surface;
   a light source module disposed under the tank and providing light to irradiate the liquid-formation material, wherein an irradiation range of the light source module only covers the irradiated area and does not cover the non-irradiated area, and the irradiated area of the bottom of the tank is equivalent to a maximum irradiation range of the light source module; and
   a controller coupled to the light source module and the movable platform and is programmed to move the movable platform above the tank along a vertical axis direction, so as to cure at least one layer object of a three-dimensional object layer by layer on the movable platform, wherein the at least one layer object consists of a plurality of object sections,
   wherein, during a period of forming the at least one layer object, the controller is programmed to 360 degrees rotate the movable platform around the vertical axis direction to move on a horizontal plane and to sequentially move and place all or a portion of the surface portions from being above the non-irradiated area to being just above the irradiated area, so as to cure the object sections of the at least one layer object sequentially above the irradiated area.

2. The three-dimensional printing apparatus according to claim 1, wherein the controller is programmed to rotate the movable platform around the vertical axis direction on the horizontal plane, and the light source module irradiates the liquid-formation material according to profile information of each of the object sections, so as to sequentially cure each of the object sections of the at least one layer object.

3. The three-dimensional printing apparatus according to claim 2, wherein the controller is programmed to sequentially rotate the movable platform around the vertical axis direction by a plurality of predetermined angles, so as to sequentially rotate and place the surface portions of the formation surface of the movable platform just above the irradiated area.

4. The three-dimensional printing apparatus according to claim 3, wherein when the movable platform is controlled by the controller to rotate around the vertical axis direction by one of the predetermined angles, the controller is programmed to place one of the surface portions of the formation surface above the irradiated area of the tank, and one of the object sections is formed between the one of the surface portions and the irradiated area.

5. The three-dimensional printing apparatus according to claim 3, wherein the number of the object sections and the number of the surface portions of the formation surface are the same.

* * * * *